Figure 1:
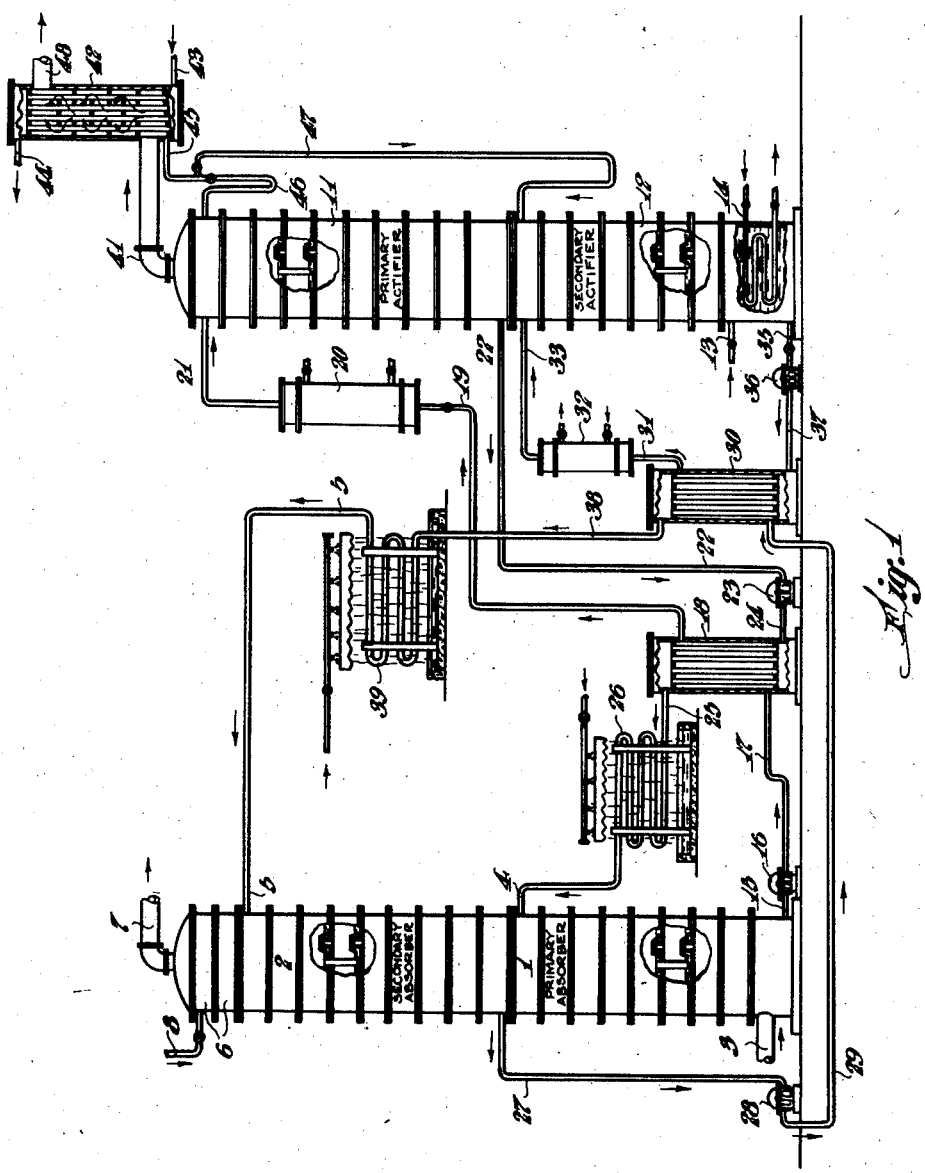

Aug. 28, 1934.  M. SHOELD  1,971,798
PURIFICATION AND SEPARATION OF GASEOUS MIXTURES
Filed Jan. 30, 1932   3 Sheets-Sheet 1

INVENTOR.
Mark Shoeld.
BY
Jesse R. Langley
ATTORNEY.

Patented Aug. 28, 1934

1,971,798

UNITED STATES PATENT OFFICE 1,971,798

PURIFICATION AND SEPARATION OF GASEOUS MIXTURES

Mark Shoeld, Mount Lebanon Township, Allegheny County, Pa., assignor to The Koppers Company of Delaware, a corporation of Delaware Application January 30, 1932, Serial No. 589,920

10 Claims. (Cl. 23—3)

My invention relates to the purification and separation of gaseous mixtures containing acidic constituents such as hydrogen sulphide, hydrogen cyanide, and carbon dioxide, and especially to the purification of fuel gases containing large amounts of hydrogen sulphide.

A number of processes have been proposed and employed for effecting the purification of gases from hydrogen sulphide which involve the continuous and cyclic recirculation of an alkaline absorbent liquid through a cycle comprising an absorption stage in which the solution is brought into contact with the gas to be treated, and an actification stage in which the solution is regenerated.

The regeneration is accomplished by means of a gaseous convection medium, such as air or steam, which serves to remove absorbed $H_2S$ and the like from the fouled solution, thereby regenerating it for further absorption.

A widely used process involves the use of a relatively dilute (1 to 3%) solution of sodium carbonate, air being used as the actifying medium. Other processes have, however, been developed in which more concentrated solutions are used; and while actification of these solutions is sometimes effected by aeration, the use of steam and elevated temperatures is more common.

Thus, the actification of these relatively strong solutions is ordinarily accomplished by the use of either direct steam or by the use of indirect steam or other indirect heat. In any event, the method involves the passage of steam or other gaseous convection medium through the solution while the latter is maintained substantially at its boiling point, the steam, if used, being derived from an external source, or from the solution itself or from both.

The so-called "hot actification processes" are of especial value in certain instances, for example, where the $H_2S$ content of the gas to be purified is very high, due to the fact that the degree of actification is large as compared with processes in which actification is accomplished at ordinary temperatures.

Solutions have been developed in the use of these hot actification processes which have very large carrying capacities with respect to $H_2S$ and the use of these solutions in hot actification processes of this character has greatly reduced the size of the apparatus necessary to effect a given purification operation as well as the rate of recirculation of absorbent liquid over the gas.

Among the solutions which have been developed for this purpose may be mentioned relatively strong solutions of sodium phenolate, potassium borate, potassium carbonate and sodium sulphide. Solutions of triethanolamine and other water-soluble organic materials of alkaline reaction have also been used to some extent, although their use is limited by reason of the relatively high cost of such materials.

One of the primary factors entering into the operating cost of processes of this character is the amount of steam or other gas necessary for actification. Even when steam is used both for the purpose of heating the solution and as a gaseous medium for conducting away liberated $H_2S$ in the actification stage, the use of efficient heat exchange apparatus greatly reduces the amount of steam required for heating purposes, by far the greater amount of steam being actually required as a convection medium.

Now Henry's law states that when a gas is dissolved in a liquid, the concentration of the dissolved gas is directly proportional to the concentration of the gas in the free space above the liquid. In other words, if the concentration of absorbed gas in the solution be plotted against the concentration of the gas in the space above the solution, the result will be a straight line, due to the direct proportion involved.

This law, however, does not hold for chemical solutions, that is to say, solutions in which the dissolved gas reacts chemically with the solvent liquid or some other solute.

Practically all gas purification solutions are of the latter character, that is to say, involve chemical solution of the absorbed $H_2S$ or the like, and all deviate more or less from Henry's law. Relatively dilute solutions, such for example as solutions containing from 1 to 5% of sodium carbonate, do not, however, show material deviations from Henry's law over the ranges of $H_2S$ concentration which may practicably be employed in gas purification processes, especially where the solution is actified at ordinary temperatures substantially the same as the temperatures at which absorption of $H_2S$ from the gas is effected.

However, when more concentrated solutions having greater carrying capacities for $H_2S$ and capable of use over wider concentration ranges (i. e. the differences between the $H_2S$ concentrations of the fouled and actified solutions) are employed, the deviation from the direct proportional relation of Henry's law becomes marked, and for certain reasons, results in a high consumption of steam or other gas used for actification, at least so far as the purifying methods and cycles used in the prior art are concerned.

Thus, relatively strong solutions of sodium phenolate, potassium carbonate, potassium borate and the like, and especially when used in processes involving actification at elevated temperatures, show marked and substantial deviations from the relation called for by Henry's law for true solutions.

I have found that, whenever, under actual operating conditions, the solution employed for the purification of the gas is found to exhibit a marked or substantial deviation from the relation of vapor pressure to concentration which would obtain if the solution were assumed to follow Henry's law, it is possible to decrease the amount of steam or other gas required for actification by operating in a novel manner to be described hereinbelow.

It is therefore an object of the present invention to provide a process of the character indicated above in which the amount of steam or other gas required for actification is materially reduced as compared with prior art processes and in which other advantages are obtained, as will appear hereinbelow.

My invention has for further objects such other operative advantages and improvements as may hereinafter be found to obtain in the process or processes and apparatus hereinafter described and claimed.

My invention contemplates the treatment of the gas to be purified in a plurality of stages and the regeneration of the solution or solutions employed in said stages in a corresponding plurality of actification stages, said actification stages being arranged along the path of the flow of steam in a sequence opposite to the sequence in which the absorption stages are arranged along the path of the gas.

The solutions employed in the several stages may be wholly or only partially independent and may constitute entirely separate and different solutions or merely different portions of the same solution.

Preferably two stages are employed, the gas to be purified passing first through a primary absorber and then through a secondary absorber, while the course of the steam in the actification stages is first through the actifier corresponding to the secondary absorber and then through the actifier corresponding to the primary absorber.

However, considerable modification in the actual flow of the solution or solutions back and forth between the two absorbers is possible, as will be apparent from the description given hereinbelow.

I have found that the operation of a process of the character set forth in accordance with my invention greatly reduces the amount of steam required for actification in a surprising and unpredictable manner. This result is due partly to the nature of the solutions employed, partly to the range of $H_2S$ concentration over which the process is worked, and partly to the method of operation, and will be somewhat briefly explained hereinbelow.

Figure 2:
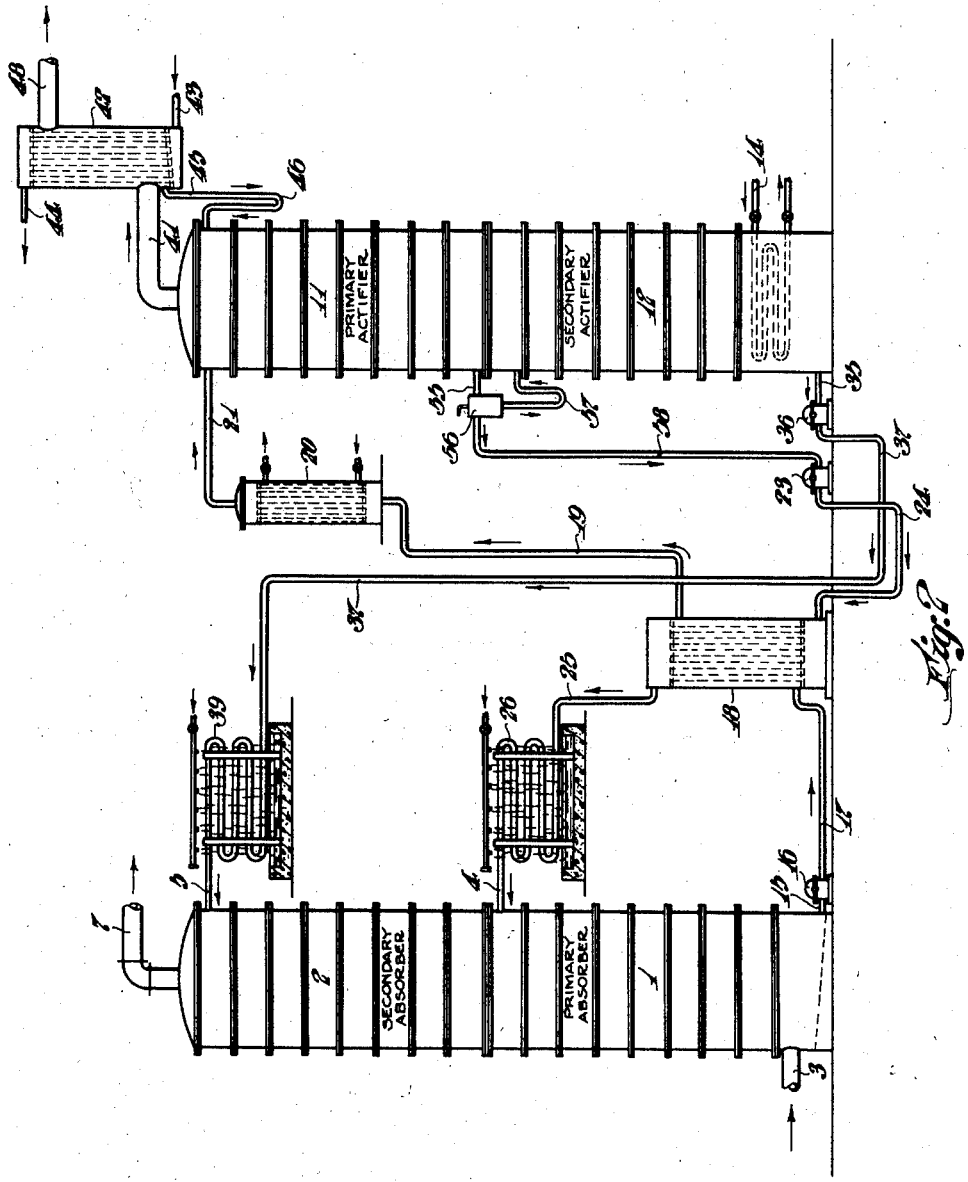
Figure 3:
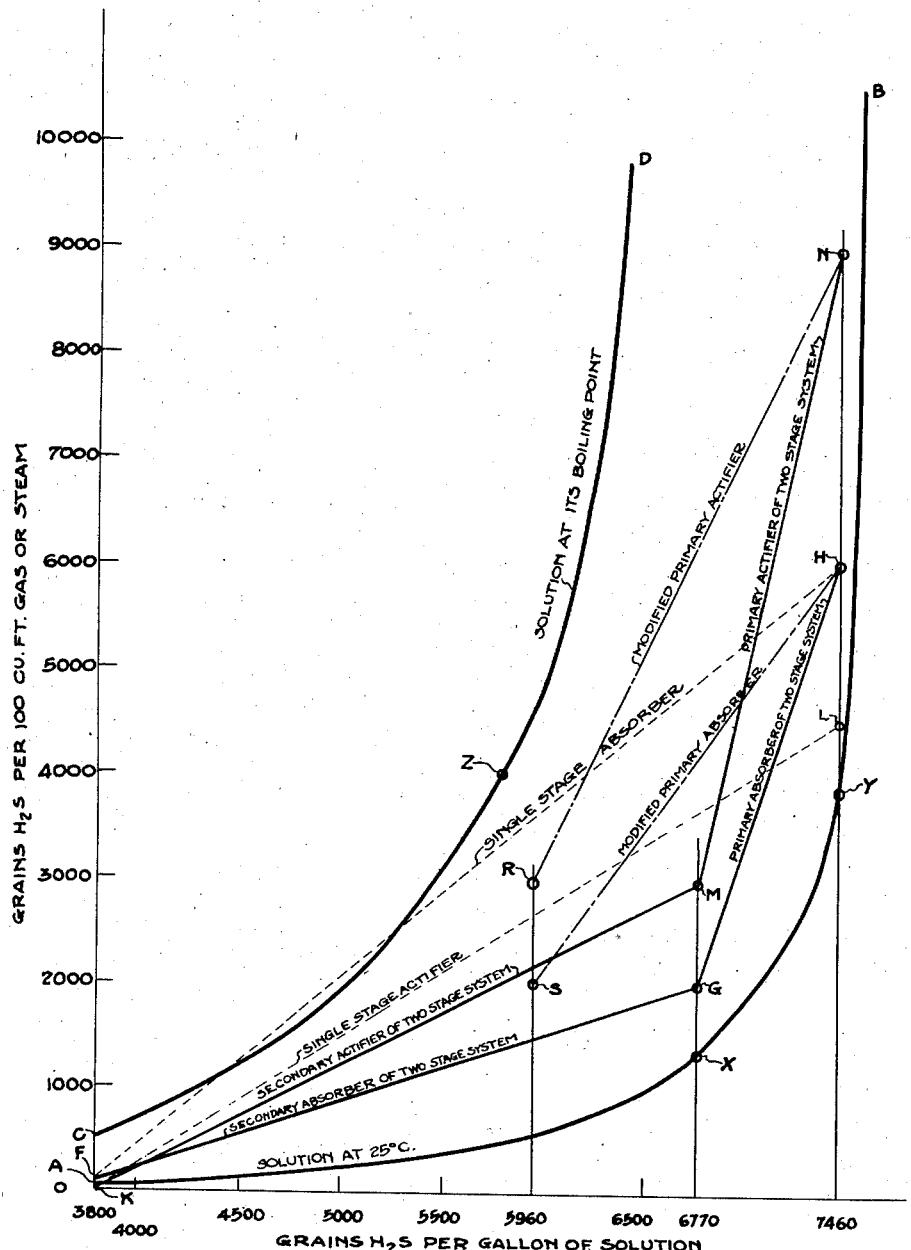

In order that my invention may be clearly set forth and understood by those skilled in the art, to whom this specification is addressed, I now describe with reference to the accompanying drawings, various preferred methods and apparatus in which it may be practiced and embodied. In the drawings, Figure 1 is a more or less diagrammatic view partly in elevation and partly in vertical section of apparatus for purifying gas from hydrogen sulphide, in accordance with my invention;

Fig. 2 is a similar view of a modified form of apparatus for the same purpose; and Fig. 3 is a graphic representation of vapor pressures of a typical purifying solution at different temperatures as well as certain typical operating conditions given for the purpose of illustrating the advantages of the process of my invention.

Similar reference numerals designate similar parts in each of the views of the drawings.

In the apparatus shown in Fig. 1, the purification of the gas takes place in an absorber having a primary stage 1 and a secondary stage 2. While various types of gas and liquid contact apparatus may be employed, that of the well known bell-and-tray type, as shown, is preferred.

The gas enters the primary absorption stage 1 through a conduit 3 located at or near the bottom thereof, and passes upward through the primary absorption stage 1 in countercurrent to a descending flow of a liquid having absorbent properties with respect to hydrogen sulphide introduced through an inlet 4 at or near the top of the primary absorber 1.

The thereby partly purified gas then enters the lower portion of the secondary absorber 2 and passes upward therethrough in countercurrent to a descending flow of absorbent liquid introduced through an inlet 5 located at or near the top of the secondary absorber 2.

The purified gas then passes through one or more trays 6 provided for the purpose of removing entrained liquids from the gas and finally passes out of the absorber through an outlet 7. The trays 6 may be supplied with water through a valved conduit 8. This water, after passing through the trays 6, may be permitted to join the liquid entering the absorber 2 through the conduit 5.

For the actification of the solution or solutions employed in the absorbers 1 and 2 there is provided apparatus which may be of the same type of construction as the absorbers 1 and 2 and comprising a primary actifier 11 and a secondary actifier 12 arranged in series and in the opposite order along the path of the flow of steam.

Thus, in the present instance the primary actifier 11 is mounted on top of the secondary actifier 12 and steam is supplied either directly from an external source through a direct steam connection 13 located at or near the bottom of the actifier 12, or is produced by boiling the solution reaching the bottom of the actifier 12, which may be accomplished by means of an indirect steam coil 14 also located at or near the bottom of the absorber 12. The steam passes first through the secondary actifier 12 and then through the primary actifier 11.

In the instance illustrated in Fig. 1, the solution employed in the primary absorber 1 is actified in the primary actifier 11, the course of the solution being as follows:

The foul solution reaching the bottom of the primary absorber 1 passes through a conduit 15, a pump 16, a conduit 17, a heat exchanger 18, a conduit 19, a preheater 20 and a conduit 21 to the top of the primary actifier 11. The solution then passes down through the primary actifier 11 in countercurrent to the rising flow of steam therein and is regenerated. The regenerated solution then returns through a conduit 22, a pump 23, a conduit 24, the heat exchanger 18, a conduit 25, a cooling coil 26 and the conduit 4 to the top of the primary absorber 1, thus completing a cycle and commencing another.

Conversely, the solution employed in the secondary absorber 2 is actified in the secondary actifier 12, the course of this solution being as follows:

The foul solution reaching the bottom of the secondary absorber 2 passes through a conduit 27, a pump 28, a conduit 29, an indirect heat exchanger 30, a conduit 31, a preheater 32 and a conduit 33 to the top of the secondary actifier 12 and then passes downward through the secondary actifier 12 in countercurrent to a rising flow of steam. The thereby regenerated solution then passes through a conduit 35, a pump 36, a conduit 37, the heat exchanger 30, a conduit 38, a cooling coil 39 and the conduit 5 to the top of the secondary absorber 2, thus completing a cycle of operation and commencing another.

The vapors reaching the top of the primary actifier 11 and consisting of steam, $H_2S$, and possibly other vapors or gases pass out of the primary actifier 11 through a conduit 41 and are delivered to a dephlegmator 42 having a cooling water inlet 43 and a cooling water outlet 44.

Any condensate which may be obtained in the dephlegmator 42 passes out of the latter through a drain conduit 45 having valved branches 46 and 47 leading to the primary actifier 11 and to the secondary actifier 12, respectively.

The cooled and dephlegmated vapors pass out of the dephlegmator 42 through a conduit 48 to be disposed of as desired.

The preheaters 20 and 32, which are provided with inlets and outlets for steam or other suitable heating fluid, are preferably so operated as to preheat the solutions passing therethrough and into the primary actifier 11 and the secondary actifier 12, respectively, substantially to the boiling point so that no condensation of steam takes place in the tops of the actifiers 11 and 12.

The reason for this lies in the fact that if, for example, condensation is permitted to take place in the primary actifier 11, the solution used in the primary stage would gradually be diluted at the expense either of the solution used in the secondary stage or of steam supplied through the inlet 13. Regulation of the effects of evaporation and condensation as between the two stages may readily be effected through the valves in the conduits 46 and 47 and by regulation of the dephlegmator 42 and the preheater 20 and offers no difficulties.

As absorbent solution for the process I prefer to employ a solution of sodium phenolate, for example, a solution containing 4 gram molecular weights of NaOH and from 2.5 to 2.6 gram molecular weights of phenol per liter. Other solutions may however be employed, as indicated hereinabove.

The same solution or similar solutions may be employed in the primary and secondary stages, or, when so desired, solutions of different concentration or even entirely different solutions may be employed in the two stages. For example, I may employ a solution of sodium phenolate in the primary stage and a solution of triethanolamine or a solution of potassium borate in the secondary stage, whenever such use of different solutions offers any advantage.

In the arrangement illustrated in Fig. 1, the primary and secondary stages are independent of each other, whereas in the modification shown in Fig. 2 a somewhat different situation prevails.

Thus, in this latter modification, while two stages are employed as before, the solution reaching the bottom of the secondary absorber 2 is allowed to mingle with the solution entering the primary absorber 1 and the combined solutions are carried from the bottom of the primary absorber 1 to the top of the primary actifier 11 through the conduits and other apparatus 15 to 21 inclusive.

The solution reaching the bottom of the primary actifier 11 is withdrawn through a conduit 55 and delivered to a flow box 56. From the flow box 56 a portion of the solution is permitted to pass through a conduit 57 to the upper part of the secondary actifier 12 while the remaining solution, usually larger in amount, passes through a conduit 58 to the pump 23, thus returning to the top of the primary absorber 1 through the heat exchanger 18, the cooler 26 and the conduit 4 as before.

In this instance the heat exchanger 32 is omitted, the conduit 37 leading directly to the cooler 39. The condensate return conduit 47 may also be omitted. As shown in Fig. 2, the trays 6 and the water supply conduit 8 have also been omitted.

The operation of my process may perhaps best be understood by comparison of a typical set of operating figures illustrating the use of a sodium phenolate solution according to my process with a similar set of figures obtained in the use of an identical solution but in which the entire purification and actification operation is effected in a cycle comprising a single-stage absorber and a single-stage actifier. This comparison follows:

| | |
|---|---|
| Grs. $H_2S$ per 100 cu. ft. in inlet gas | 6,000 |
| Grs. $H_2S$ per 100 cu. ft. in outlet gas | 80 |
| Grs. $H_2S$ removed | 5,920 |
| Grs. $H_2S$ per gallon of fresh solution | 3,800 |
| Grs. $H_2S$ per gallon of foul solution | 7,460 |
| Grs. $H_2S$ removed, per gallon of solution | 3,660 |
| Gallons of solution per 1,000 cu. ft. of gas | 16.1 |
| Grs. $H_2S$ per 100 cu. ft. of steam entering actifier | 0 |
| Grs. $H_2S$ per 100 cu. ft. of steam leaving actifier | 0 |
| Grs. $H_2S$ removed per cu. ft. of steam | 45 |
| Lbs. steam required per 1,000 cu. ft. of gas | 52.6 |

*Two-stage process*

| | Primary stage | Secondary stage | Total of both stages |
|---|---|---|---|
| Grs. $H_2S$ per 100 cu. ft. in inlet gas | 6,000 | 2,000 | 6,000 |
| Grs. $H_2S$ per 100 cu. ft. in outlet gas | 2,000 | 80 | 80 |
| Grs. $H_2S$ removed | 4,000 | 1,920 | 5,920 |
| Grs. $H_2S$ per gallon of fresh solution | 6,770 | 3,800 | |
| Grs. $H_2S$ per gallon of foul solution | 7,460 | 6,770 | |
| Grs. $H_2S$ removed, per gallon of solution | 690 | 2,970 | |
| Gallons of solution per 1,000 cu. ft. of gas | 58 | 6.5 | 64.5 |
| Grs. $H_2S$ per 100 cu. ft. of steam entering actifier | 3,000 | 0 | 0 |
| Grs. $H_2S$ per 100 cu. ft. of steam leaving actifier | 9,000 | 3,000 | 9,000 |
| Grs. $H_2S$ removed per cu. ft. of steam | 60 | 30 | 90 |
| Lbs. steam required per 1,000 cu. ft. of gas | 26.7 | 25.6 | 26.7 |

Inasmuch as the steam employed in the secondary actifier according to my process is later used in the primary actifier, and since the steam requirements of the two stages in the instance given above are 25.6 lbs. and 26.7 lbs. per 1,000 cu. ft. of gas purified, respectively, the total steam required is only 26.7 lbs. per 1,000 cu. ft. of gas purified, whereas in the single stage process of the prior art the same purification operation required 52.6 lbs. of steam per 1,000 cu. ft. of gas purified.

It will be clear from the above example and explanation that best results are obtained when the rates of recirculation in the several stages are so proportioned that the total steam requirements of the several actification stages are substantially the same.

While the steam saving effected by means of my process is very great and appears most surprising it may perhaps more readily be understood from a consideration of the essential nature of the solutions employed and their vapor pressures.

In Fig. 3 the curve AB represents the vapor pressure of dissolved hydrogen sulphide in a typical sodium phenolate solution at 25° C., the curve being expressed in terms of the number of grains of $H_2S$ per gallon of solution as compared with the number of grains $H_2S$ per 100 cu. ft. of gas or steam in perfect equilibrium with the solution.

Thus the point X on this curve represents the vapor pressure of the solution when it contains 6,770 grains $H_2S$ per gallon at 25° C., at which point the solution is in equilibrium with gas or steam containing approximately 1,340 grains of $H_2S$ per 100 cu. ft. The point Y on the curve AB represents the same solution when containing 7,460 grains $H_2S$ per gallon of solution, at which point it is in equilibrium with gas or steam containing approximately 3,880 grains $H_2S$ per 100 cu. ft.

The curve CD represents the vapor pressure of the solution at its boiling point. Thus point Z on the curve CD represents solution having an $H_2S$ content of 5,800 grains per gallon in equilibrium at the boiling point temperature with gas containing 4,000 grains $H_2S$ per 100 cu. ft.

It will be noted in the specific examples given hereinabove that the $H_2S$ content of the solution varies from 3,800 to 7,460 grains of $H_2S$ per gallon and it will be evident from the curves AB and CD of Fig. 3 that the vapor pressure curves over this range are not straight, as would be true if the vapor pressures of the solution followed Henry's law, but are strongly curved.

That is to say, the vapor pressure of the solution rises more and more rapidly as the concentration of $H_2S$ in the solution increases. For example, the vapor pressure of the solution illustrated graphically in Fig. 3 (at any temperature) changes more rapidly between, say, 7,000 grains $H_2S$ per gallon and 7,500 grains $H_2S$ per gallon, than it does between 6,500 grains per gallon and 7,000 grains per gallon.

The actual operating conditions in the specific examples given hereinabove are illustrated by straight lines in Fig. 3. Thus the operation of the single stage absorber is illustrated by the dotted line FH, point F corresponding to the $H_2S$ content (80 grains per 100 cu. ft. of gas) in the gas leaving the absorber and 3,800 grains $H_2S$ per gallon of solution, the $H_2S$ content of the fresh solution entering the absorber. The point H corresponding to the $H_2S$ content of the gas entering the absorber (6,000 grains per 100 cu. ft. of gas) and the $H_2S$ content of the solution leaving the absorber (7,460 grains of $H_2S$ per gallon of solution.)

As the reduction of $H_2S$ content of the gas is proportional to the increase in $H_2S$ content of the solution, it is evident that the line FH must be straight and that a point on the line FH corresponding to a given $H_2S$ content of the solution at any given point in the absorber will correspond to the $H_2S$ content of the gas at the same point and vice versa.

The line representing the actual operation of the absorber, for example, the line FH, must always lie between two points located above the curve AB, the vertical differences between these two points and the curve AB representing the "driving force" which is necessary in practice in order for the transfer of $H_2S$ from the gas to the solution to take place.

The operation of the primary absorber of the two-stage system is illustrated by the line GH, the point G corresponding to the $H_2S$ content of the solution entering the primary absorber 1 (6,770 grains $H_2S$ per gallon of solution) and the $H_2S$ content of the gas leaving the primary absorber 1 (2,000 grains $H_2S$ per 100 cu. ft. of gas). The operation of the secondary absorber of the two-stage system is illustrated by the line FG.

The slope of the operating lines FH, FG, and GH determine the ratio of solution to gas in the absorber. Thus the slope of the line FG, which line is comparatively flat, corresponds to the low rate of recirculation (6.5 gallons per 1,000 cu. ft. of gas treated) in the secondary system, while the slope of the curve GH which is quite steep corresponds to the much higher rate of recirculation (58 gallons of solution per 1,000 cu. ft. of gas) in the primary system. Similarly, the slope of the line FH which is between those of the lines FG and GH, respectively, corresponds to the rate of recirculation (16.1 gallons of solution per 1,000 cu. ft. of gas) in the single stage system.

It is in consideration of the operating lines of the actifiers, however, that the advantages of my invention are most effectively explained. Thus the line KL represents the operation of the single stage actifier, in which the entering steam contains no $H_2S$ and the solution entering the actifier contains 7,460 grains of $H_2S$ per gallon, while the steam leaving the actifier contains 4,500 grains $H_2S$ per 100 cu. ft., and the solution leaving the actifier contains 3,800 grains $H_2S$ per gallon.

In other words, this line KL represents the specific operating figures given hereinabove for a single-stage system, indicating an actifier in which the $H_2S$ content of the solution is reduced from 7,460 to 3,800 grains $H_2S$ per gallon, the steam entering free from $H_2S$ and leaving at a concentration of 4,500 grains $H_2S$ per 100 cu. ft. of steam.

This operating line KL of the actifier cannot cross the curve CD and in fact must remain some distance below the curve CD in order that the requirement for "driving force" between the steam and solution may be satisfied.

Moreover, the slope of the operating line for the actifier determines the steam requirement. When the curve is comparatively flat, as is the line KL, the amount of steam required per gallon of solution is high. Consequently, due to the shape of the curve CD, the operating line KL of the single-stage actifier gets farther and farther away from the curve CD as the concentration of $H_2S$ in the solution increases.

It is this relation between the actual operating line KL of the actifier and the actual vapor pressure curve CD which limits the steam economy of the single-stage system of the prior art, and it will be evident that any system in which the operating line or lines of the actifier or actifiers can be made to approach the curve CD more closely will result in a decrease in the number of pounds of steam required for actification, per gallon of solution recirculated.

This result is effected, according to my invention, by operating in a plurality of stages, as described hereinabove, so that in place of a single operating line for the actifier, there are several at various angles, these lines as a whole approaching the curve CD more closely than can ever be true of the single operating line of a single-stage actifier.

The line KM represents the operation of the secondary actifier of the two-stage system and the line MN represents the operation of the primary actifier of the two-stage system. The point M corresponds to the H2S content of the solution leaving the primary actifier and of the solution entering the secondary actifier (6,770 grains per gallon) and to the H2S content of the steam leaving the secondary actifier and entering the primary actifier, (3,000 grains per 100 cu. ft.). The point N represents the H2S content of the solution entering the primary actifier (7,460 grains per gallon) and the H2S content of the steam leaving the primary actifier (9,000 grains of H2S per 100 cu. ft.).

Since the slope of the line MN is very much steeper than that of the line KM, it follows that the steam required for actification per gallon of solution in the primary actification stage is very much lower than the steam required per gallon in the lower or secondary stage actifier.

This difference in the steam requirements is only partly balanced by the increased rate of recirculation in the primary stage indicated by the slope of the line GH, while on the other hand the relatively higher steam ratio in the secondary actifier indicated by the line KM is more than balanced by the low rate of recirculation indicated by the line FG.

Consequently, in the primary stage the rate of recirculation is relatively high but the steam required for actification per gallon of solution is very low, and in the secondary stage the opposite is true. The result of these differences as compared with the single-stage system is a marked lowering of the steam requirement of the system as a whole, that is to say, the amount of steam required per 1,000 cu. ft. of gas purified a given amount. This result is obtained due to the fact that the operating lines of the absorbers and actifiers of my two-stage system more closely approximate the actual vapor pressure curves AB and CD of the solution than is possible when a single stage system is employed.

It may further be remarked that under ordinary operating conditions the advantages of the saving in steam required for actification greatly outweigh the very slight disadvantage which follows from the necessity of recirculating the solution at higher rates.

It is important to observe that there is a limit to the economy to be gained by the use of any given number of stages, which limit is due to the fact that the maximum H2S concentration of the steam leaving the actifier is fixed by the amount of H2S removed from the gas in the corresponding absorber.

Thus, in the specific instance given hereinabove, difference between the point N, representing the H2S concentration (9,000 grains H2S per 100 cu. ft.) of the steam leaving the primary actifier, and the point M, representing the H2S concentration (3,000 grains per 100 cu. ft.) of the steam entering the primary actifier, is 6,000 grains per 100 cu. ft. Similarly, the difference between the points M and K is 3,000 grains per 100 cu. ft. The ratio of these differences is 2:1, this being roughly the ratio of the amounts of H2S removed per 100 cu. ft. of gas in the primary and secondary absorbers (4,000 grains and 1,920 grains, respectively).

Obviously, no more H2S is liberated in any actifier than is removed in the corresponding absorber. In other words, the amount of H2S removed per 1,000 cu. ft. of gas must equal the change in H2S concentration per cu. ft. of the steam passing through the actifier, multiplied by the number of cubic feet of steam so used.

When the two recirculation stages are entirely independent of each other, as in the system of Fig. 1, even the slight disadvantage due to an increased rate of recirculation may be considerably reduced by slightly modifying the operation. This modification consists simply in reducing as far as possible the rate of recirculation of the solution through the primary absorber 1 and the primary actifier 11 and is exemplified in the following table:

*Modified two-stage process*

|  | Primary stage | Secondary stage | Total of both stages |
|---|---|---|---|
| Grs. H2S per 100 cu. ft. in inlet gas | 6,000 | 2,000 | 6,000 |
| Grs. H2S per 100 cu. ft. in outlet gas | 2,000 | 80 | 80 |
| Grs. H2S removed | 4,000 | 1,920 | 5,920 |
| Grs. H2S per gallon of fresh solution | 5,960 | 3,800 | |
| Grs. H2S per gallon of foul solution | 7,460 | 6,770 | |
| Grs. H2S removed per gallon of solution | 1,500 | 2,970 | |
| Gallons of solution per 1,000 cu. ft. of gas | 27 | 6.5 | 33.5 |
| Grs. H2S per 100 cu. ft. of steam entering actifier | 3,000 | 0 | 0 |
| Grs. H2S per 100 cu. ft. of steam leaving actifier | 9,000 | 3,000 | 9,000 |
| Grs. H2S removed per cu. ft. of steam | 60 | 30 | 90 |
| Lbs. steam required per 1,000 cu. ft. of gas | 26.7 | 25.6 | 26.7 |

On the graph of Fig. 3 the operating lines SH and RN represent the modified operation of the primary absorber and actifier, respectively. Thus, both the points R and S represent a concentration of 5,960 grains H2S per gallon of solution, which is the concentration of the solution leaving the primary actifier and entering the primary absorber. The point S represents a concentration of 2,000 grains H2S per 100 cu. ft. of gas, which is the concentration of H2S in the gas leaving the primary absorber, while the point R represents a concentration of 3,000 grains H2S per 100 cu. ft., which is the concentration of H2S in the steam entering the primary actifier 11.

Since the primary and the secondary stages are independent in the instance shown in Fig. 1, it is not necessary that the operating line of the primary absorber should meet that of the secondary absorber, nor that the operating line of the primary actifier should meet that of the secondary actifier.

The same condition is not, however, possible in the modification shown in Fig. 2 due to the fact that a portion of the liquid leaving the primary actifier is returned to the top of the secondary actifier while the remaining portion of the solution enters the top of the primary absorber. This means that the operating lines of the primary and secondary actifiers must meet, as at M.

However, the system shown in Fig. 2 is advantageous in that a reduction in the amount of apparatus required is effected, only one heat exchanger and one preheater being required in this instance, as compared with the two heat exchangers and two preheaters required in the instance shown in Fig. 1.

It will have been observed that in each instance, the solution employed in the primary stage is relatively highly sulphided as compared with the solution used in the secondary stage. Thus, while in each of the several instances given above the same degree of purification is effected, it will be evident that more complete purification of the gas may be effected by means of my two-stage or multiple-stage process, than is possible with a single-stage system, for a given steam consumption.

In some gas purification processes, especially those of the "cold actification" type in which the removal of hydrogen sulphide from the gas is accomplished by means of a dilute solution which is actified by treating it with air or other inert gas at atmospheric temperature, the range of actification (i. e., the difference between the $H_2S$ content of the fouled solution and that of the regenerated solution) under practicable operating conditions is comparatively small.

Consequently, over such small ranges of actification, the vapor pressure curves of such solutions are practically straight. In other words, over the actual range employed, such solutions substantially follow Henry's law. Under such conditions, the use of two or more stages in the manner disclosed herein is of little value insofar as any saving in the amount of air or other gas required for actification is concerned.

My invention finds its greatest utility, therefore, where, over the range of actification desired, the vapor pressures of the purifying solution or solutions employed exhibit a marked deviation from Henry's law, as is true of practically all relatively concentrated gas purifying solutions, especially those employed in hot-actification processes of the character described.

My invention is therefore not limited to the use of any particular solution, such as the solution of sodium phenolate described hereinabove, or to any particular temperature range, or to the use of any particular actifying gas, such as steam or air, or to any particular number of stages.

The specific operating figures given hereinabove are based upon the results of experience obtained in the purification of gas on a large scale with a typical sodium phenolate solution, and are included herein by way of illustration and explanation.

My invention is not limited to the purification of gases containing $H_2S$ or the like as impurity but may be employed for the separation or purification of any gaseous mixture containing such constituents.

It will therefore be obvious to those skilled in the art that my invention is not limited to such specific illustrative examples as have been given hereinabove, but may variously be embodied and practiced within the scope of the claims hereinafter made.

I claim as my invention:

1. In the method of purifying a gas from hydrogen sulphide and analogous acidic impurities which comprises washing the flowing gas with an absorbent solution, removing the solution from the gas, regenerating it by treating it with a gaseous convection medium to drive off the absorbed impurities and recirculating the regenerated solution over the gas for further absorption, the improvement which comprises: treating the gas in a plurality of absorption stages located in series along the path of the gas with a plurality of flows of absorbent solution in concentrations that show a marked deviation from Henry's law and regenerating the flows of fouled absorbent solution in a corresponding plurality of regeneration stages located in an opposite sequence in the path of a flow of a gaseous convection medium in series therethrough, the vapor pressures of the several flows of absorbent solution under the actual conditions of operation exhibiting substantial deviation from the vapor pressures which would be possessed by the same if they followed Henry's law, and the first regeneration stage being by-passed by regenerated liquid from a subsequent regeneration stage in the serial flow of the convection medium.

2. In the method of purifying a gas from hydrogen sulphide and analogous acidic impurities which comprises washing the flowing gas with an absorbent solution, removing the solution from the gas, regenerating it by treating it with a gaseous convection medium to drive off the absorbed impurities and recirculating the regenerated solution over the gas for further absorption, the improvement which comprises: treating the gas in a plurality of absorption stages located in series along the path of the gas with a plurality of flows of absorbent solution in concentrations that show a marked deviation from Henry's law and regenerating the flows of fouled absorbent solution in a corresponding plurality of regeneration stages located in an opposite sequence in the path of a flow of steam in series therethrough, the regeneration stage through which the steam first passes being by-passed by regenerated liquor from a later regeneration stage through which the steam subsequently passes in series.

3. In the method of purifying a gas from hydrogen sulphide and analogous acidic impurities which comprises washing the flowing gas with an absorbent solution, removing the solution from the gas, regenerating it by treating it with a gaseous convection medium to drive off the absorbed impurities and recirculating the regenerated solution over the gas for further absorption, the improvement which comprises: treating the gas in two absorption stages located in series along the path of the gas with separate flows of absorbent solution in concentrations that show a marked deviation from Henry's law and regenerating the separate flows of absorbent solution in two regeneration stages located in an opposite sequence in the path of a flow of steam in series therethrough, and regenerated liquor from the second regeneration stage in the serial flow of the steam by-passing the first regeneration stage.

4. In the method of purifying a gas from hydrogen sulphide and analogous acidic impurities which comprises washing the flowing gas with an absorbent solution, removing the solution from the gas, regenerating it by treating it with a gaseous convection medium to drive off the absorbed impurities and recirculating the regenerated solution over the gas for further absorption, the improvement which comprises: treating the gas in two absorption stages located in series along the path of the gas with separate flows of an alkaline absorbent solution of high carrying capacity with respect to the absorbed impurity or impurities and regenerating the separate flows of the fouled solution in two regeneration stages located in an opposite sequence in the path of a flow of steam in series therethrough, and regenerated liquor from the second regeneration stage in the serial flow of the steam by-passing the first regeneration stage.

5. In the method of purifying a gas from hydrogen sulphide and analogous acidic impurities which comprises washing the flowing gas with an absorbent solution, removing the solution from the gas, regenerating it by treating it with a gaseous convection medium to drive off the absorbed impurities and recirculating the regenerated solution over the gas for further absorption, the improvement which comprises: treating the gas in a plurality of absorption stages located in series along the path of the gas with separate flows of a sodium phenolate solution and regenerating the fouled solution in a corresponding plurality of actification stages arranged in an opposite sequence in the path of a flow of steam in series therethrough, the regeneration stage through which the steam first passes being by-passed by regenerated liquor from a later regeneration stage through which the steam subsequently passes in series.

6. In the method of purifying a gas from hydrogen sulphide and analogous acidic impurities which comprises washing the flowing gas with an absorbent solution, removing the solution from the gas, regenerating it by treating it with a gaseous convection medium to drive off the absorbed impurities and recirculating the regenerated solution over the gas for further absorption, the improvement which comprises: treating the gas in a plurality of absorption stages located in series along the path of the gas with separate flows of a potassium borate solution and regenerating the fouled solution in a corresponding plurality of actification stages arranged in an opposite sequence in the path of a flow of steam in series therethrough, the regeneration stage through which the steam first passes being by-passed by regenerated liquor from a later regeneration stage through which the steam subsequently passes in series.

7. In the method of purifying a gas from hydrogen sulphide and analogous acidic impurities which comprises washing the flowing gas with an absorbent solution, removing the solution from the gas, regenerating it by treating it with a gaseous convection medium to drive off the absorbed impurities and recirculating the regenerated solution over the gas for further absorption, the improvement which comprises: treating the gas in a plurality of absorption stages located in series along the path of the gas with separate flows of a solution of triethanolamine and regenerating the fouled solution in a corresponding plurality of actification stages arranged in an opposite sequence in the path of a flow of steam in series therethrough, the regeneration stage through which the steam first passes being by-passed by regenerated liquor from a later regeneration stage through which the steam subsequently passes in series.

8. In the method of purifying a gas from hydrogen sulphide and analogous acidic impurities which comprises the recirculation of a regenerable absorbent solution in concentrations that show a marked deviation from Henry's law through a cycle comprising an absorption stage in which the solution is brought into contact with the gas and an actification stage in which the solution is regenerated by passing a gaseous convection medium therethrough, the improvement which consists in: washing the gas with a flow of absorbent liquid in a primary absorption stage for the removal of a portion of its hydrogen sulphide content and with another flow of absorbent liquid in a secondary stage for further purification, regenerating the solution used in the secondary absorption stage by heating it, and passing the hot vapors thereby liberated through the liquid used in the primary absorption stage to regenerate the same, the liquid regenerated for the primary absorption stage being by-passed relative to the regeneration of the solution for the secondary absorption stage.

9. In the method of purifying a gas from hydrogen sulphide and analogous acidic impurities which comprises the recirculation of a regenerable absorbent liquid in concentrations that show a marked deviation from Henry's law through a cycle comprising an absorption stage in which the solution is brought into contact with the gas and a regeneration stage in which the solution is regenerated by passing steam therethrough, the improvement which consists in: treating the gas in a plurality of absorption stages located in series in the path of the gas with a corresponding plurality of flows of absorbent liquid and regenerating the flows of absorbent liquid in a series of regeneration stages arranged in an opposite sequence in the path of a flow of steam, the rates of recirculation of the several flows of liquid being so proportioned that the amounts of steam required in the actification stages to balance the absorptions effected in the corresponding absorption stages are substantially the same.

10. In the method of purifying a gas from hydrogen sulphide and analogous acidic impurities which comprises the recirculation of a regenerable absorbent liquid in concentrations that show a marked deviation from Henry's law through a cycle comprising an absorption stage in which the solution is brought into contact with the gas and a regeneration stage in which the solution is regenerated by passing steam therethrough, the improvement which consists in: washing the gas with a flow of absorbent liquid in a primary absorption stage for the removal of a portion of its hydrogen sulphide content and with another flow of absorbent liquid in a secondary stage for further purification, commingling the flows of absorbent liquid from the respective absorption stages, regenerating the commingled solution by passing it through an actification stage in counter-current relation with a flow of steam, removing a portion of the solution from an intermediate point of the flow of the steam in said actification stage and recirculating it over the gas in said primary absorption stage, removing the remaining portion of the solution from a further point of the flow of the steam in said actification stage and recirculating it over the gas in said secondary absorption stage.

MARK SHOELD.